United States Patent
Mino et al.

(10) Patent No.: US 8,339,737 B2
(45) Date of Patent: Dec. 25, 2012

(54) PERPENDICULAR MAGNETIC RECORDING HEAD INCLUDING NON-MAGNETIC PROTRUDING LAYER

(75) Inventors: Tetsuya Mino, Hong Kong (CN); Naoto Matono, Hong Kong (CN); Ikuhito Onodera, Hong Kong (CN); Kazushi Nishiyama, Hong Kong (CN); Michitoshi Tsuchiya, Hong Kong (CN); Kenji Sasaki, Hong Kong (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 490 days.

(21) Appl. No.: 12/457,521

(22) Filed: Jun. 12, 2009

(65) Prior Publication Data

US 2010/0315741 A1    Dec. 16, 2010

(51) Int. Cl.
*G11B 5/147* (2006.01)
(52) U.S. Cl. .............................. 360/125.03; 360/125.13
(58) Field of Classification Search ............. 360/125.02, 360/125.03, 125.13, 125.14, 125.15
See application file for complete search history.

(56) References Cited

U.S. PATENT DOCUMENTS

| | | | | |
|---|---|---|---|---|
| 4,811,142 A * | 3/1989 | Nakashima et al. | ........ | 360/234.7 |
| 5,003,423 A * | 3/1991 | Imamura et al. | ......... | 360/125.03 |
| 5,175,658 A * | 12/1992 | Chang et al. | ................ | 360/235.2 |
| 6,198,600 B1 * | 3/2001 | Kitao et al. | ................ | 360/235.2 |
| 6,697,221 B2 * | 2/2004 | Sato et al. | ................ | 360/125.13 |
| 7,375,925 B2 * | 5/2008 | Sasaki et al. | ............. | 360/123.02 |
| 7,443,633 B2 * | 10/2008 | Tagami et al. | ............. | 360/125.5 |
| 7,518,824 B2 * | 4/2009 | Sasaki et al. | ............. | 360/125.09 |
| 7,551,395 B2 * | 6/2009 | Maruyama et al. | ...... | 360/125.13 |
| 7,558,020 B2 * | 7/2009 | Sasaki et al. | ............. | 360/125.14 |
| 7,903,370 B2 * | 3/2011 | Kurihara et al. | ......... | 360/123.46 |
| 7,933,095 B2 * | 4/2011 | Sasaki et al. | ............. | 360/125.12 |
| 8,021,535 B2 * | 9/2011 | Bonhote et al. | ............. | 205/122 |
| 2004/0090704 A1 * | 5/2004 | Matono et al. | ................ | 360/126 |
| 2006/0002014 A1 * | 1/2006 | Sasaki et al. | ................ | 360/125 |
| 2006/0077590 A1 * | 4/2006 | Sasaki et al. | ................ | 360/126 |
| 2008/0112081 A1 * | 5/2008 | Matono | .................... | 360/125.08 |
| 2008/0144215 A1 * | 6/2008 | Hsiao et al. | ............. | 360/119.04 |
| 2009/0168240 A1 * | 7/2009 | Hsiao et al. | ............. | 360/125.02 |

FOREIGN PATENT DOCUMENTS

JP    2007-26506    2/2007

* cited by examiner

*Primary Examiner* — Brian Miller
(74) *Attorney, Agent, or Firm* — Nixon & Vanderhye PC

(57) ABSTRACT

A perpendicular magnetic write head capable of suppressing damage and corrosion of a magnetic pole to secure a stable writing performance is provided. A non-magnetic protruding layer protruding from a main magnetic pole layer (tip portion) toward an air bearing surface side is formed on both sides of the tip portion in a writing track width direction. The non-magnetic protruding layer is located closer to a recording medium than the tip portion during writing operation, and is more likely to be in contact with the writing medium instead of the tip portion. Since the protective film portion covering the tip portion hardly peels off (e.g., compared to the protective film portion covering the non-magnetic protruding layer), the tip portion is hardly damaged or corroded. Since the tip portion is protected physically and chemically by the non-magnetic protruding layer, deterioration of the soft magnetic characteristics of the tip portion is suppressed.

2 Claims, 13 Drawing Sheets

PERPENDICULAR MAGNETIC RECORDING HEAD INCLUDING NON-MAGNETIC PROTRUDING LAYER

BACKGROUND OF THE INVENTION

1. Field of the Invention

The present invention relates to a perpendicular magnetic write head provided with a magnetic pole and a protective film that covers the magnetic pole from an air bearing surface side.

2. Description of the Related Art

In recent years, performance improvement of a magnetic write head is required because of the increasing surface writing density of a magnetic recording medium such as a hard disk (hereinafter referred to as "recording medium"). Accordingly, a perpendicular magnetic write head in which a signal magnetic field is set in a direction perpendicular to a surface of the recording medium attracts attention. This is because of the advantages that a linear recording density increases and data written into the recording medium is less affected by the influence of heat fluctuation.

The perpendicular magnetic write head is provided with a thin film coil that generates a magnetic flux, and so on, together with a main magnetic pole layer. The main magnetic pole layer includes a tip part (magnetic pole) of a microscopic width that generates a writing magnetic field (perpendicular magnetic field). The magnetic pole is covered with a protective film from an air bearing surface side.

As for a configuration of the perpendicular magnetic write head, it is proposed to use a protective film made of hard amorphous carbon, in order to improve a corrosion resistance and abrasion resistance of the magnetic pole (for example, see Japanese Patent Application Publication No. 2007-026506).

These days, since a distance (fly height) between the magnetic pole and the recording medium decreases extremely, the magnetic pole is much more likely to be in contact with the recording medium. Since such contact of the magnetic pole causes the protective film to peel off and the magnetic pole to be exposed therefrom, the magnetic pole is more likely to be damaged and corroded due to oxidation, etc. The corrosion trend is outstanding in particular when the magnetic pole is formed of a high saturated magnetic flux density material such as an iron-based alloy.

SUMMARY OF THE INVENTION

The present invention has been made in view of the above problems, and it is an object of the present invention to provide a perpendicular magnetic write head capable of suppressing damage and corrosion of a magnetic pole so as to secure a writing performance.

A perpendicular magnetic write head according to the present invention includes: a magnetic pole; a non-magnetic protruding layer formed on at least a part of regions which include both side regions of the magnetic pole in a writing track width direction and a trailing side region of the magnetic pole, the non-magnetic protruding layer protruding from the magnetic pole toward an air bearing surface side; and a protective film formed to cover at least the magnetic pole from the air bearing surface side.

In the perpendicular magnetic write head according to the present invention, the non-magnetic protruding layer protruding from the magnetic pole toward the air bearing surface side is provided on at least the part of the regions which include the both side regions of the magnetic pole in the writing track width direction and the trailing side region of the magnetic pole. In this case, since the non-magnetic protruding layer comes closer to the recording medium than the magnetic pole at the time of writing operation, it is more likely to be in contact with the recording medium instead of the magnetic pole. Thereby, the protective film which covers the magnetic pole is less likely to be peeled off, and thus the magnetic pole is less likely to be damaged and corroded. Accordingly, since the magnetic pole is protected physically and chemically by the non-magnetic protruding layer, it becomes possible to suppress the damage and the corrosion of the magnetic pole compared with the case where the non-magnetic protruding layer is not provided. In addition, since the soft magnetic characteristics of the magnetic pole are less likely to deteriorate, the writing performance can be secured.

DETAILED DESCRIPTION OF THE PREFERRED EMBODIMENTS

Embodiments of the invention will be described in detail hereinbelow with reference to the drawings.

Figure 1:
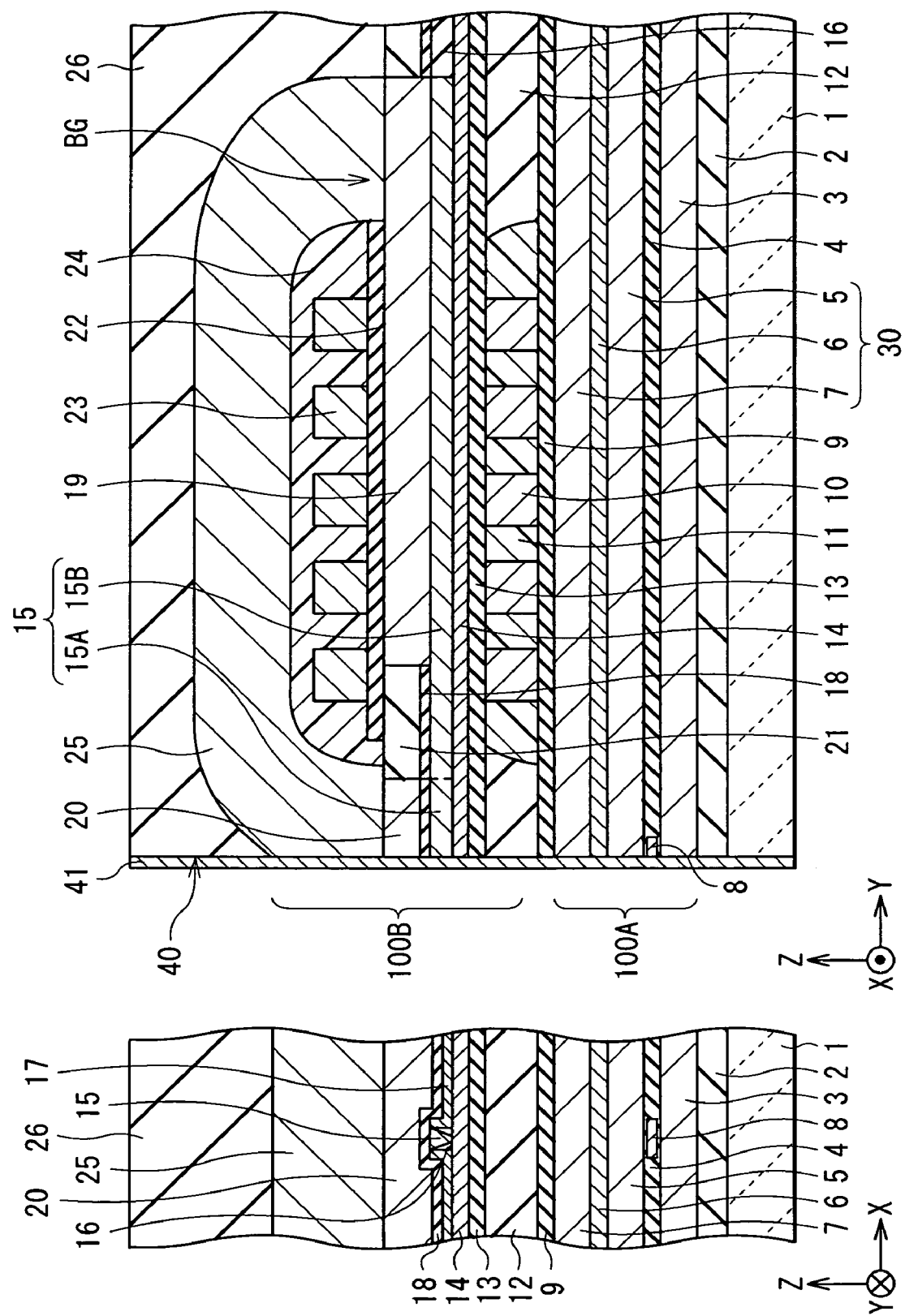
FIG. 1 is a sectional view illustrating a configuration of a thin film magnetic head provided with a perpendicular magnetic write head according to an embodiment of the present invention.

First, description will be given on a configuration of a thin film magnetic head provided with a perpendicular magnetic write head according to an embodiment of the present invention. FIG. 1 illustrates a cross sectional configuration of the thin film magnetic head, in which (A) illustrates a cross section parallel to an air bearing surface 40, and (B) illustrates a cross section perpendicular to the air bearing surface 40, respectively. In the following description, dimensions in X, Y and Z directions represented in FIG. 1 are defined as "width", "length" and "thickness" respectively. In addition, a side closer to the air bearing surface 40 in the Y-axis is defined as a "front side", and a side far therefrom is defined as a "rear side". Further, if a state of a recording medium (not illustrated) which makes a relative movement with respect to the thin film magnetic head is regarded as a stream, a side ahead of the stream is defined as a "trailing side", and a side behind the stream is defined as a "leading side". These definitions are applied also to FIG. 2 and after, which will be hereinbelow described.

The thin film magnetic head to be described here applies a magnetic processing to a recording medium such as a hard disk, and is, for example, a combined write and read head that can execute both of the write and read processings.

The thin film magnetic head is a stacked structure in which an insulating layer 2, a read head section 100A executing the read processing by means of a magneto-resistive effect (MR: magneto-resistive effect), a separating layer 9, a write head section 100B executing the write processing of a perpendicular magnetic write type, and an overcoat layer 26, are stacked in order on a substrate 1, for example. The thin film magnetic head has the air bearing surface 40 as a common side face of the stacked structure, and the air bearing surface 40 is provided with a protective film 41.

The substrate 1 is made of a ceramic material such as an AlTic ($Al_2O_3 \cdot TiC$), for example. The insulating layer 2, the separating layer 9 and the overcoat layer 26 are made of a non-magnetic insulation material such as aluminium oxide ($Al_2O_3$, hereinafter referred to as "alumina"), for example.

In the read head section 100A, a lower read shield layer 3, a shield gap layer 4 and an upper read shield layer 30 are stacked in this order. A read element (MR element 8) is embedded in the shield gap layer 4 with one end thereof exposed on the air bearing surface 40.

The lower read shield layer 3 and the upper read shield layer 30 are made of a magnetic material such as a nickel iron alloy (NiFe), for example. Examples of the nickel iron alloy include "permalloy" (trade name), which contains a nickel content of eighty weight percent and an iron content of twenty weight percent, etc. In the upper read shield layer 30, a non-magnetic layer 6 is sandwiched with upper read shield layer portions 5 and 7. The upper read shield layer portions 5 and 7 are made of a magnetic material such as permalloy, for example, and the non-magnetic layer 6 is made of a non-magnetic conductive material such as ruthenium (Ru) or a non-magnetic insulation material such as alumina, for example.

The shield gap layer 4 is made of a non-magnetic insulation material such as alumina, for example. The MR element 8 utilizes giant magneto-resistive effect (GMR: giant magneto-resistive effect) or tunneling magneto-resistive effect (TMR: tunneling magneto-resistive effect) etc., for example.

In the write head section 100B, a first thin film coil 10 embedded by insulating layers 11 to 13, a non-magnetic foundation layer 14, a main magnetic pole layer 15, a non-magnetic adjoining layer 16, a non-magnetic protruding layer 17, a gap layer 18, an auxiliary magnetic pole layer 19, a write shield layer 20, an insulating layer 21, a second thin film coil 23 embedded by insulating layers 22 and 24, and a return yoke 25 are stacked in this order.

The thin film coil 10 is made of a high conductivity material such as copper (Cu) for example, and has a structure in which the thin film coil 10 is wound around a back gap BG (spiral structure).

The insulating layer 11 is made of a non-magnetic insulation material such as photoresist or spin on glass (SOG: Spin On Glass) exhibiting fluidity at the time of heating, for example, and the insulating layers 12 and 13 are made of a non-magnetic insulation material such as alumina, for example.

The non-magnetic foundation layer 14 is made of a non-magnetic conductive material such as a nickel chromium alloy (NiCr) or a non-magnetic insulation material such as alumina, for example.

The main magnetic pole layer 15 extends backward from the air bearing surface 40, and is made of, for example, a magnetic material having high saturation flux density such as iron-based alloy. Examples of the iron-based alloy include an iron cobalt alloy (FeCo) or an iron cobalt nickel alloy (FeCoNi). The main magnetic pole layer 15 includes a tip portion 15A having a definite width that defines the width of a writing track, and a rear end portion 15B having a wider width than the definite width in this order from the side of the air bearing surface 40, for example. The tip portion 15A is a portion substantially generating a perpendicular magnetic field (magnetic pole).

The non-magnetic adjoining layer 16 and the gap layer 18 are made of a non-magnetic insulation material such as alumina, for example.

The non-magnetic protruding layer 17 is protruded toward the side of the air bearing surface 40 (to a side approaching the recording medium) from the main magnetic pole layer 15 so as to protect the main magnetic pole layer 15 from being in contact with the recording medium. The non-magnetic protruding layer 17 includes a non-magnetic material whose etching rate at the time of ion milling or plasma etching, etc. is slower than the main magnetic pole layer 15, for example. Examples of such non-magnetic material include at least one kind of material of metal materials and alloy materials, for example. The metal material is, for example, ruthenium, titanium, tantalum, tungsten, chromium or the like, and the alloy material is, for example, a material including two or more kinds of metallic elements enumerated in connection with the metal material, and more specifically, such as a nickel chromium alloy. The metal material and the alloy material may contain elements other than the metallic elements (nonmetallic element). The non-magnetic protruding layer 17 may be either a monolayer or a multilayer.

The above-mentioned "the etching rate is slower than the main magnetic pole layer 15" means that progression rate of the etching process is slower in the non-magnetic protruding layer 17 than that in the main magnetic pole layer 15 at the time of etching both of the main magnetic pole layer 15 and the non-magnetic protruding layer 17 in the manufacturing process of the thin film magnetic head. Namely, the non-magnetic protruding layer 17 is more difficult to be etched than the main magnetic pole layer 15.

The auxiliary magnetic pole layer 19 is made of similar magnetic material as the main magnetic pole layer 15, for example. The auxiliary magnetic pole layer 19 extends backward from a position recessed from the air bearing surface 40 in the trailing side of the main magnetic pole layer 15, and is connected to the main magnetic pole layer 15 on the side far from the air bearing surface 40.

The write shield layer 20 extends backward from the air bearing surface 40 in the trailing side of the main magnetic pole layer 15 while neighboring the gap layer 18, and is made of similar magnetic material as the main magnetic pole layer 15, for example.

The insulating layer 21 is formed between the auxiliary magnetic pole layer 19 and the write shield layer 20, and is made of a non-magnetic insulation material such as alumina, for example.

The material and configuration, etc., of the thin film coil 23 are similar to those of the thin film coil 10, for example.

The insulating layer 22 is made of similar non-magnetic insulation material as that of the insulating layers 12 and 13 for example, and the insulating layer 24 is made of similar non-magnetic insulation material as that of the insulating layer 11, for example. These insulating layers 22 and 24 are connected to the insulating layer 21, and the forefront edges of the insulating layers 22 and 24 are recessed from the forefront edge of the insulating layer 21, for example.

The return yoke layer 25 extends backward from the air bearing surface 40 in the trailing side of the auxiliary magnetic pole layer 19 and the write shield layer 20, and is connected to the write shield layer 20 on the front portion thereof while connected to the auxiliary magnetic pole layer 19 on the back-gap BG on the rear portion thereof. The return yoke layer 25 is made of similar magnetic material as that of the main magnetic pole layer 15, for example.

The protective film 41 is provided to cover a series elements including the main magnetic pole layer 15 from the side of the air bearing surface 40, and is made of diamond-like carbon (DLC: diamond like carbon) etc., for example.

Figure 2:
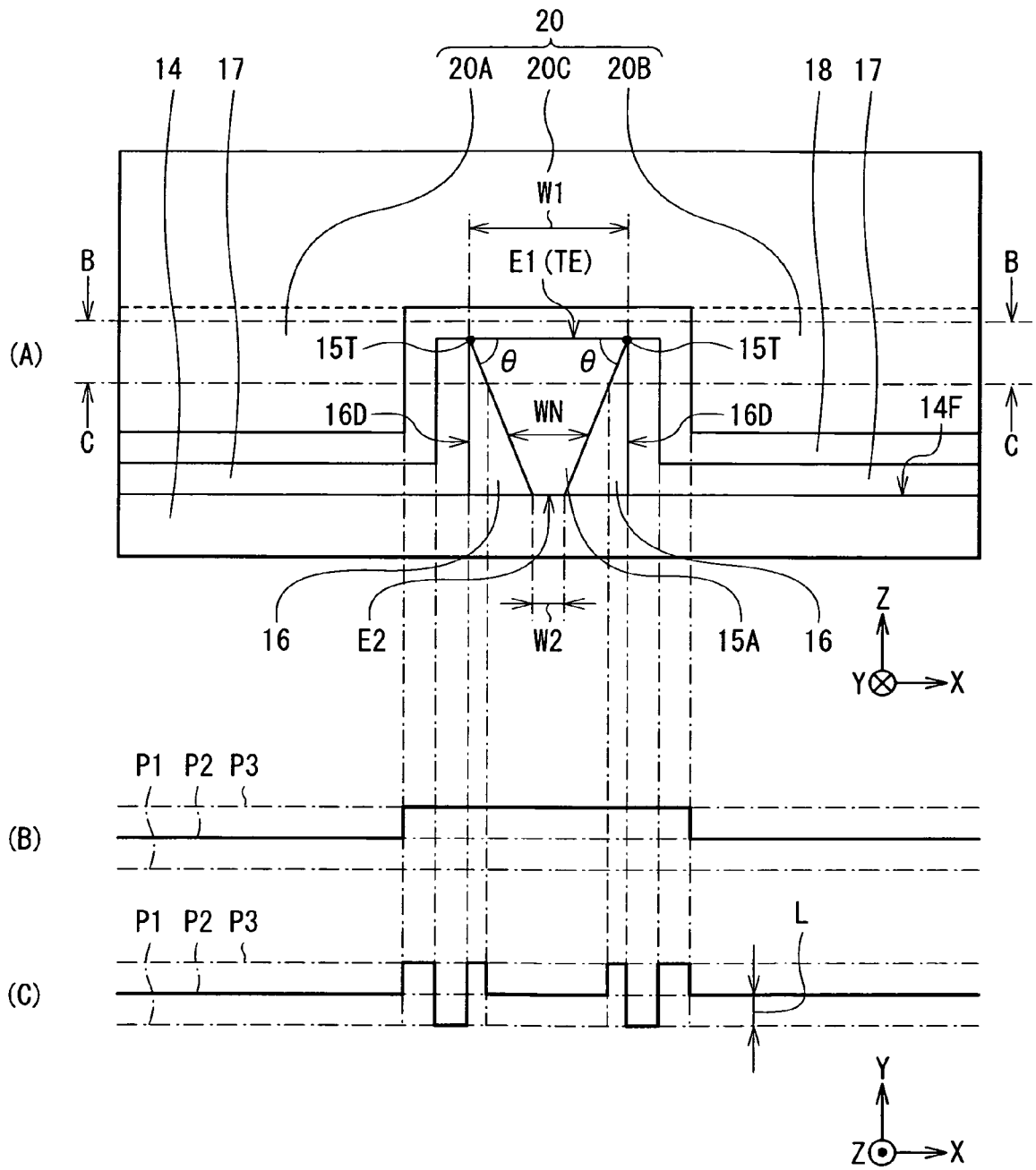
FIG. 2 is an enlarged cross sectional view illustrating an end face configuration of a principal portion of the thin film magnetic head on an air bearing surface.

Subsequently, detailed configuration of the thin film magnetic head will be explained. FIG. 2 is an enlarged view illustrating an end face configuration of a principal portion of the thin film magnetic head of FIG. 1 on the air bearing surface 40. In FIG. 2, (A) illustrates the end face, and (B) and (C) illustrate the height distribution taken along the lines B-B and C-C illustrated in (A), respectively.

Here, since one end surface of the tip portion 15A is exposed on the air bearing surface 40, a plane including the end surface is defined as the air bearing surface 40. Namely, a position of the air bearing surface 40 in a direction where the thin film magnetic head approaches the recording medium (Y-axis direction) corresponds to a position of the one end surface of the tip portion 15A. The position of the one end surface of the tip portion 15A is a position "P2" in (B) and (C) of FIG. 2. Accordingly, a position "P1" is a position protruding over the one end surface (air bearing surface 40) of the tip portion 15A (position near the recording medium), and a position "P3" is a position recessed from the one end surface (air bearing surface 40) of the tip portion 15A (position far from the recording medium).

The tip portion 15A, the non-magnetic adjoining layer 16, the non-magnetic protruding layer 17, and the gap layer 18 are formed on the non-magnetic foundation layer 14 as a substrate, and the write shield layer 20 is formed on the gap layer 18.

The tip portion 15A has a width which is larger on a side far from the non-magnetic foundation layer 14 than on a side close to the non-magnetic foundation layer 14, for example. For this reason, a shape of the end face of the tip portion 15A has an end edge E1 (trailing-edge TE) located on the trailing side, and an end edge E2 (leading edge LE) located on the leading side, for example, and the width W1 of the end edge E1 is larger than the width W2 of the end edge E2.

In the end face of the tip portion 15A, when the widths W1, W2 and a width "WN" of an arbitrary position between the end edge E1 and the end edge E2 are compared, the width W1 is equal to or larger than the width W2, and the width W1 is larger than the width "WN". The width W2 may be larger than zero, or may be substantially zero. When the width W2 is larger than zero, that means the shape of the end face is a shape in which the end edge E2 is one side, while when the width W2 is substantially zero, that means the shape of the end face is a shape in which the end edge E2 is a vertex of angular portions. The cross sectional configuration of the tip portion 15A may be either the same as that of the shape of the end face or different therefrom.

Here, the shape of the end face of the tip portion 15A is a trapezoid (inverted trapezoid) where the end edge E1 is the upper base (long side) and the end edge E2 is the lower base (short side), for example. The bevel angles θ (angle of gradient of the side ends) in this case is not limited in particular.

The non-magnetic adjoining layer 16 is adjacent to the tip portion 15A on both sides in the writing track width direction (direction of X axis), and has side faces 16D on the sides not adjacent to the tip portion 15A. The outermost edge portions 15T in the writing track width direction of the tip portion 15A are located on a plane including the side faces 16D (coincides with the plane of the side faces 16D). Here, although the side face 16D may be slanted off a surface plane 14F of the non-magnetic foundation layer 14, it is preferable that the slanted angle be as small as possible, and it is more preferable that the side face 16D be perpendicular to the surface plane 14F. It is because that can facilitate the thickness control of the gap layer 18 with a high degree of accuracy in the manufacturing process of the thin film magnetic head.

The non-magnetic protruding layer 17 is formed at least a part of the surroundings of the tip portion 15A as viewed from the air bearing surface 40. As far as the non-magnetic protruding layer 17 is formed in the surroundings of the tip portion 15A, a formation position is not limited in particular.

Also, the non-magnetic protruding layer 17 is formed on at least a part of regions which include both side regions of the tip portion 15A in the writing track width direction and a trailing side region of the tip portion 15A. Namely, the formation position of the non-magnetic protruding layer 17 may be on both sides of the tip portion 15A, on only one of them, on the trailing side of the tip portion 14A only, or on two or more combinations thereof.

Here, the non-magnetic protruding layer 17 is formed on both sides of the tip portion 15A, facing each other with the tip portion 15A in between, for example. More specifically, the non-magnetic protruding layer 17 is formed so as to cover the side faces 16D of the non-magnetic adjoining layer 16 for example. In this case, the non-magnetic protruding layer 17 may be formed to cover the side faces 16D and also the surface plane 14F of the non-magnetic foundation layer 14 in the periphery thereof.

The quantity of protrusion (protrusion length L) of the non-magnetic protruding layer 17 protruding from the tip portion 15A (air bearing surface 40) is not limited in particular. However, it is preferable that a value of the protrusion length L be large enough to suppress the peeling-off of the protective film 41 that covers the tip portion 15A due to the excessive contact of the recording medium with the protective film 41, and be small enough so that the tip portion 15A can apply the recording processing normally to the recording medium. Specifically, the protrusion length L is, for example, preferably about 0.01 nm to 5.0 nm, and more preferably about 0.1 nm to 1.0 nm, and still more preferably about 0.1 nm to 0.5 nm. In order to realize such protrusion length L, the non-magnetic protruding layer 17 preferably includes ruthenium, titanium, tantalum, tungsten, chromium or a nickel chromium alloy, and more preferably includes ruthenium or titanium, and still more preferably, the non-magnetic protruding layer 17 is substantially configured of the above-mentioned materials, when the tip portion 15A is formed of iron-based alloys such as an iron cobalt nickel alloy, for example.

The gap layer 18 is formed between the tip portion 15A and the write shield layer 20, and is further formed so as to cover both of the tip portion 15A and the non-magnetic protruding layer 17.

The write shield layer 20 includes side shield layers 20A and 20B provided adjacently to the tip portion 15A in the writing track width direction via the gap layer 18, and a trailing shield layer 20C provided on the trailing side of the tip portion 15A. Here, the side shield layers 20A and 20B and the trailing shield layer 20C are integrated, for example. The "integrated" means that the side shield layers 20A and 20B and the trailing shield layer 20C are formed in the same production process, and they are in an undetachable state. However, the side shield layers 20A and 20B and the trailing shield layer 20C may not be integrated, and they may be formed to be detachable in separate production processings. Here, in FIG. 2, the boundary zone of the side shield layers 20A and 20B and the trailing shield layer 20C is denoted with a broken line.

Here, the gap layer 18 functions as a magnetic gap between the tip portion 15A and the write shield layer 20. Specifically, a portion between the tip portion 15A and the side shield layers 20A and 20B functions as a side gap, and a portion between the tip portion 15A and the trailing shield layer 20C functions as a trailing gap (write gap).

Positions of the one end surfaces of the respective elements in the direction where the thin film magnetic head approaches the recording medium (Y-axis direction) are distributed as illustrated in (C) of FIG. 2. More specifically, the one end surface of the tip portion 15A is located in the position P2 (air bearing surface 40). On the other hand, the non-magnetic protruding layer 17 is protruded from the one end surface of the tip portion 15A (air bearing surface 40), and the one end surface of the non-magnetic protruding layer 17 is located in the position P1. The one end surface of the write shield layer 20 is located in the position P2, as in the one end surface of the tip portion 15A, for example. The non-magnetic adjoining layer 16 and the gap layer 18 are recessed from the one end surface of the tip portion 15A (air bearing surface 40) for example, and the end surfaces of the non-magnetic adjoining layer 16 and the gap layer 18 are located in the position P3.

The thin film magnetic head is operated as follows.

When electric current flows into the thin film coil 23 of the write head section 100B and a writing magnetic flux is generated at the time of writing information, the magnetic flux flows through the inside of the main magnetic pole layer 15 toward the tip portion 15A and gathers in the vicinity of the trailing edge TE. When the magnetic flux is emitted outside to generate a perpendicular magnetic field, information is magnetically written on the recording medium with the perpendicular magnetic field.

In this case, a magnetic flux for leakage prevention is generated in the thin film coil 10 so that the writing magnetic flux is less likely to flow out into the read head section 100A. Thereby, the deterioration of the detecting accuracy in the MR element 8 is suppressed, and also an unwilling erasure of the information written in the recording medium due to unnecessary magnetic fields generated in the lower read shield layer 3 and the upper read shield layer 30 is also suppressed. In addition, since the magnetic flux generated from the tip portion 15A is partially (spread components) taken into the write shield layer 20, diffusion of the perpendicular magnetic field is suppressed and the gradient increases. The magnetic flux taken into the write shield layer 20 is supplied again to the main magnetic pole layer 15 via the return yoke layer 25.

The magnetic flux emitted from the main magnetic pole layer 15 returns to the return yoke layer 25 via the recording medium, and is supplied again to the main magnetic pole layer 15. In this manner, the magnetic flux circulates between the write head section 100B and the recording medium, thereby establishing a magnetic circuit.

Meanwhile, when sense current flows into the MR element 8 of the read head section 100A at the time of reading the information, the resistance value of the MR element 8 changes in accordance with a signal magnetic field for the reading of the recording medium. Since such resistance change is detected as a voltage change, the information written on the recording medium is magnetically read out.

Next, a method of manufacturing the thin film magnetic head will be explained. Here, since materials, dimensions and configuration of the series of elements have been already described in detail, description thereof will be omitted as needed. FIGS. 3 to 15 are views to explain a manufacturing process of the thin film magnetic head, and illustrate a cross-sectional configuration corresponding to FIG. 2.

The thin film magnetic head is formed by sequentially forming and stacking the series of elements, mainly by means of existing thin film process. The existing thin film process means, for example, a film formation technique such as a plating process and a sputtering process, a patterning technique such as a photolithography method, an etching technique such as a dry etching process and a wet etching process, and a polishing technique such as a chemical mechanical polishing (CMP: chemical mechanical polishing), etc. However, technique other than the above-mentioned ones may also be used.

Figure 3:
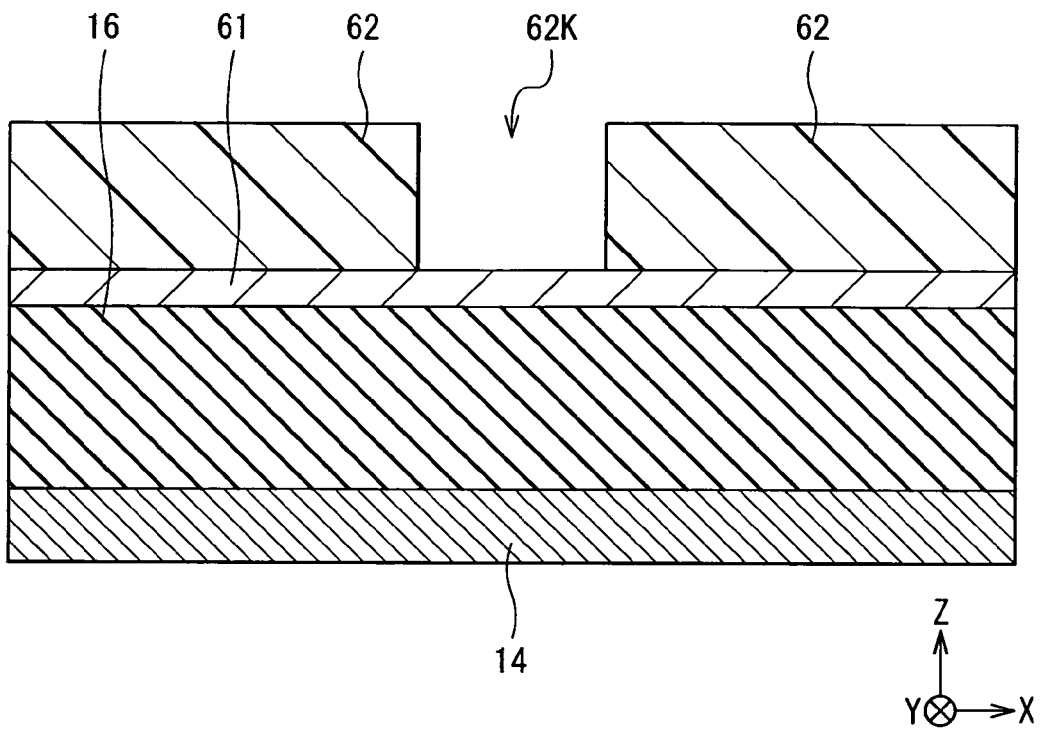
FIG. 3 is a sectional view to explain a manufacturing method of the principal portion of the thin film magnetic head.

When the principal portion of the thin film magnetic head is to be formed, a non-magnetic foundation layer 14 is first formed by a sputtering process etc., on the substrate 1 where the read head section 100A and so on are formed, as illustrated in FIG. 3. In this case, for example, a material, by which the non-magnetic foundation layer 14 can be utilized as an etching stop layer (for example, nickel chromium alloy etc.) when performing the etching process with a reactive ion etching (RIE: reactive ion etching) process etc. in the post-production process, is used.

Subsequently, after forming the non-magnetic adjoining layer 16 on the non-magnetic foundation layer 14 by a sputtering process etc., a mask layer 61 is formed on the non-magnetic adjoining layer 16 in a similar manner by a sputtering process etc. In this case, a metal material such as ruthenium, or an alloy material such as nickel chromium alloy is used as the formation material of the mask layer 61.

Subsequently, a photoresist pattern 62 having an opening portion 62K is formed on the mask layer 61 by using a photolithography method. In this case, after applying a photoresist to the surface of the mask layer 61 to form a photoresist film, the photoresist film is patterned (exposed and developed), for example.

Figure 4:
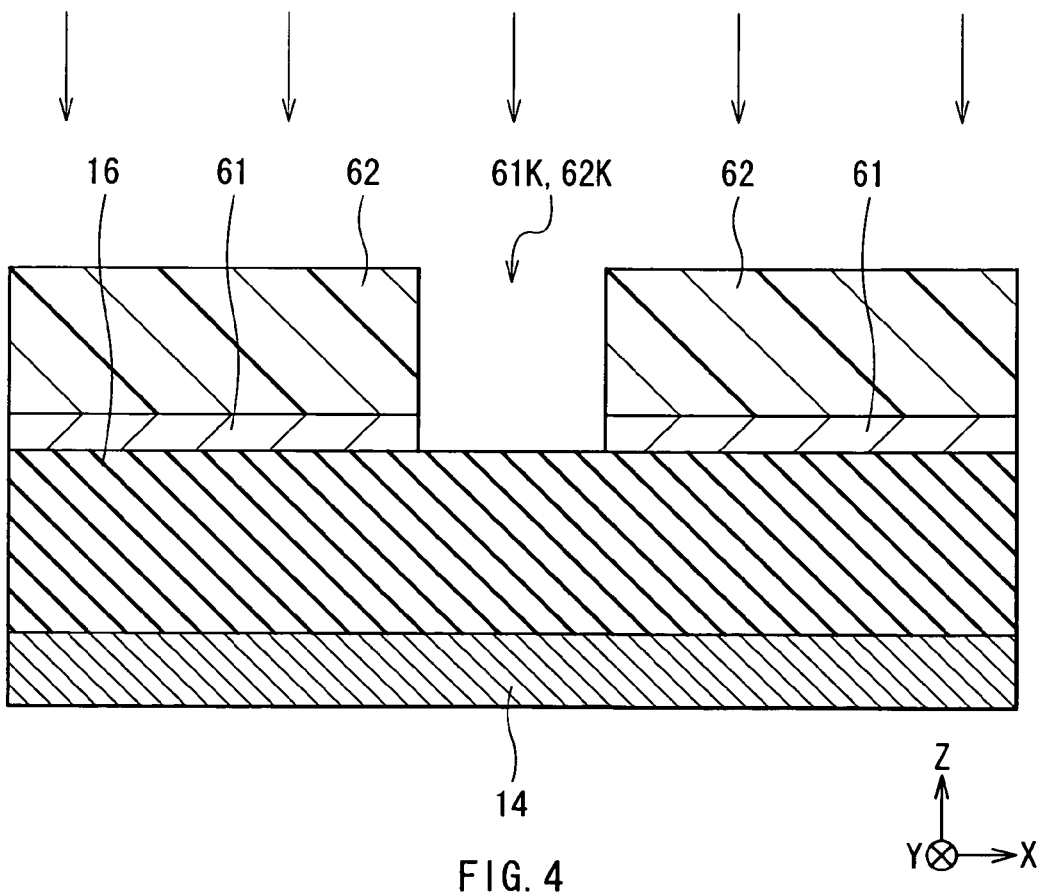
FIG. 4 is a sectional view to explain a step subsequent to that of FIG. 3.

Subsequently, as illustrated in FIG. 4, an opening portion 61K is formed in a part corresponding to the opening portion 62K, by etching the mask layer 61 with an ion milling method etc., with the photoresist pattern 62 utilized as a mask.

Figure 5:
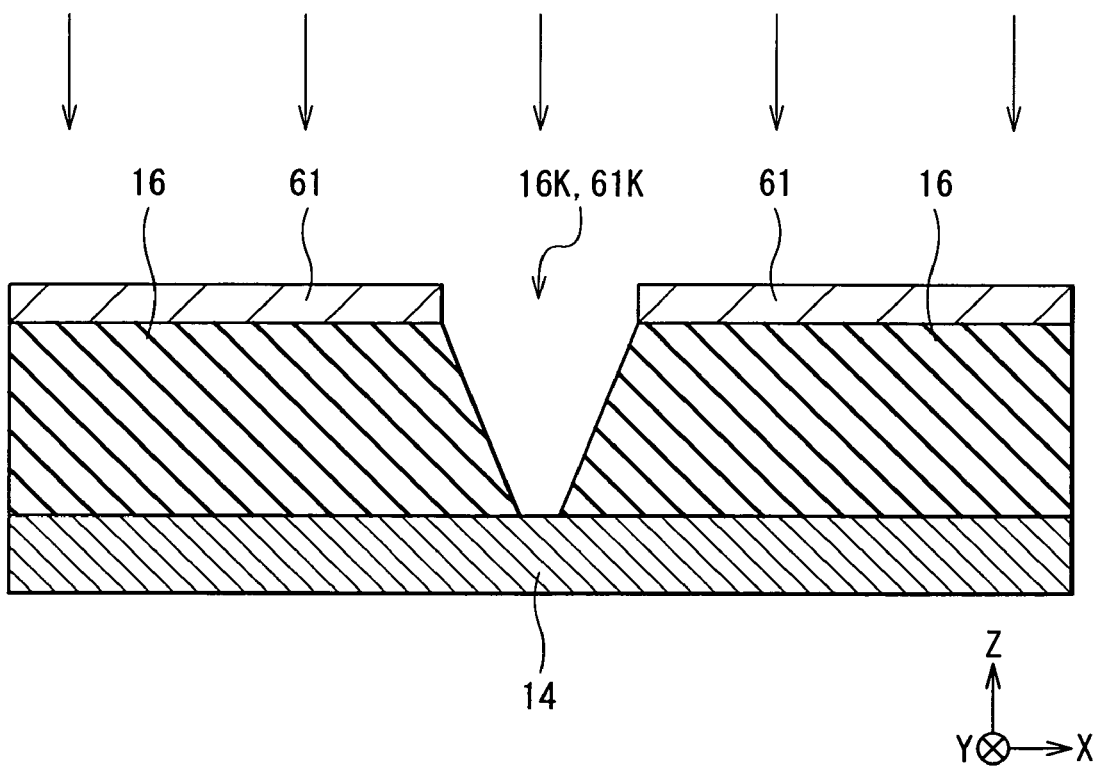
FIG. 5 is a sectional view to explain a step subsequent to that of FIG. 4.

Subsequently, as illustrated in FIG. 5, after removing the photoresist pattern 62, an opening portion 16K is formed in a part corresponding to the opening portion 61K by etching the non-magnetic adjoining layer 16 with the RIE process etc., such that the non-magnetic foundation layer 14 is exposed through the opening portion 16K. In this case, since the non-magnetic foundation layer 14 functions as the etching stop layer, for example, the etching process is substantially completed at the time that the non-magnetic foundation layer 14 is exposed in the opening portion 16K. In the etching process, since etched materials (shaved non-magnetic adjoining layer 16) are deposited as the etching process proceeds, the opening portion 16K becomes wider on the side far from the non-magnetic foundation layer 14 than on the side close to the non-magnetic foundation layer 14.

Figure 6:
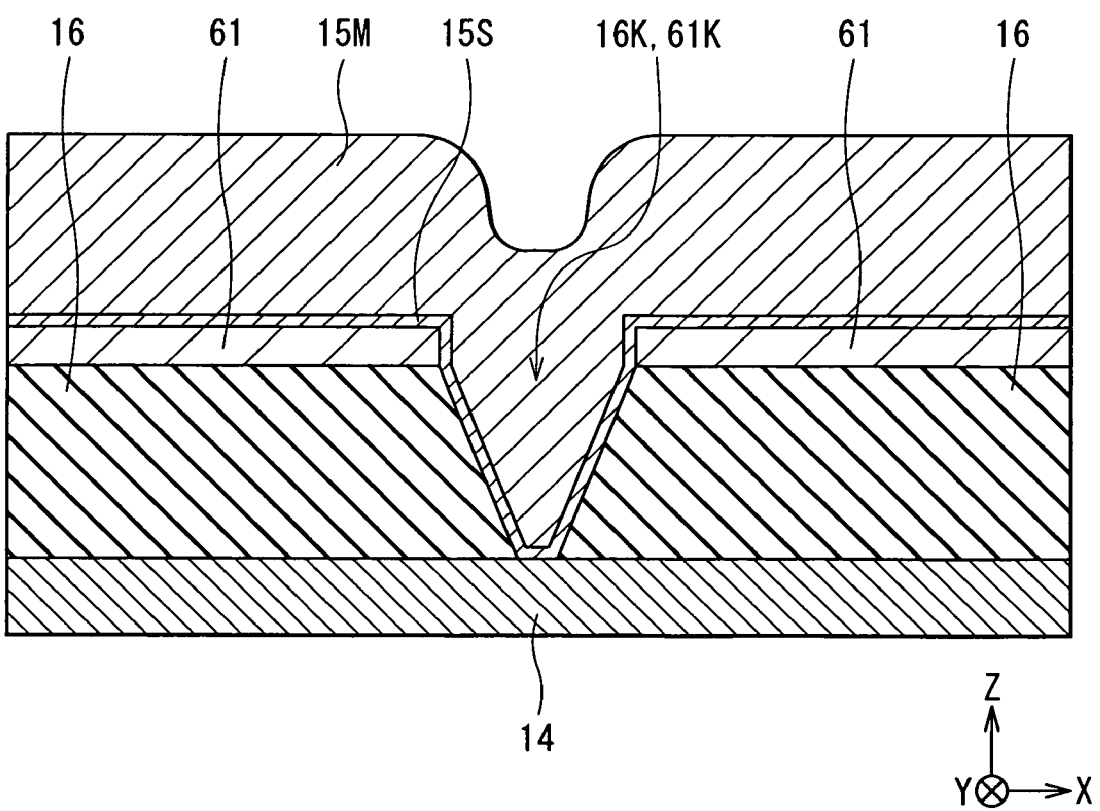
FIG. 6 is a sectional view to explain a step subsequent to that of FIG. 5.
Figure 7:
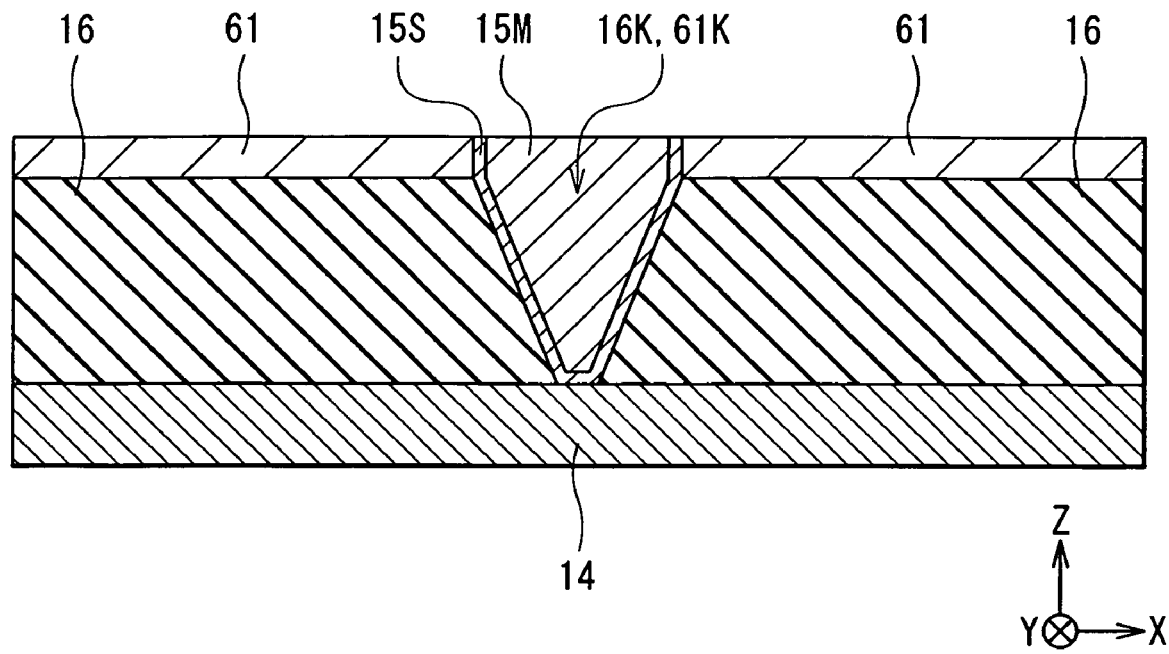
FIG. 7 is a sectional view to explain a step subsequent to that of FIG. 6.
Figure 8:
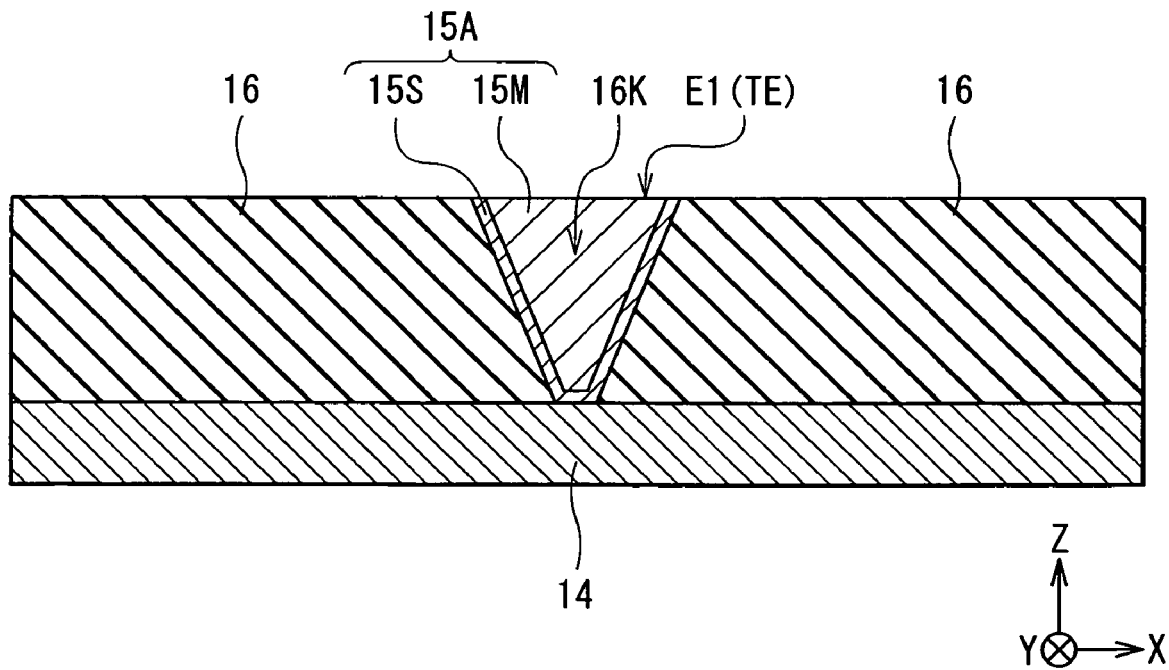
FIG. 8 is a sectional view to explain a step subsequent to that of FIG. 7.

Subsequently, the tip portion 15A is formed in the opening portion 16K as shown in FIGS. 6 to 8. A fabrication procedure of the tip portion 15A is, for example, as follows.

First, as illustrated in FIG. 6, a seed layer 15S is formed to cover the inner face of the opening portion 16K (the inner wall surface of the non-magnetic adjoining layer 16 and the exposed surface of the non-magnetic foundation layer 14) and its periphery (the surface of the mask layer 61) with a sputtering process or the like. In this case, similar magnetic material as the main magnetic pole layer 15 is used, for example.

Subsequently, a metal coating layer 15M is grown, with the seed layer 15S utilized as an electrode film, so as to fill in the opening portion 16K. In this case, similar magnetic material as the main magnetic pole layer 15 is used, for example. Further, the thickness thereof is provided sufficiently to fill in not only the opening portion 16K but the opening portion 61K and further cover the seed layer 15S of their periphery, in order to planarize the metal coating layer 15M in the post-production process, for example.

Subsequently, the metal coating layer 15M is polished (planarized) by a CMP process etc., and only the portion embedded in the opening portions 16K and 61K is caused to remain, as illustrated in FIG. 7. In this case, the polishing process is performed until the mask layer 61 is exposed. A polishing operation may be performed excessively as necessary to ensure that the mask layer 61 is exposed.

Finally, as illustrated in FIG. 8, an ion milling method etc. is used so that the mask layer 61 is removed and only a portion of the seed layer 15S and a portion of the metal coating layers 15M embedded in the opening portion 16K are caused to remain. In this case, the etching process is performed until the non-magnetic adjoining layer 16 is exposed. An etching may be performed excessively as necessary to ensure that the non-magnetic adjoining layer 16 is exposed.

Thus, the tip portion 15A (the seed layer 15S and the metal coating layer 15M) as illustrated in FIG. 2 is formed.

Figure 9:
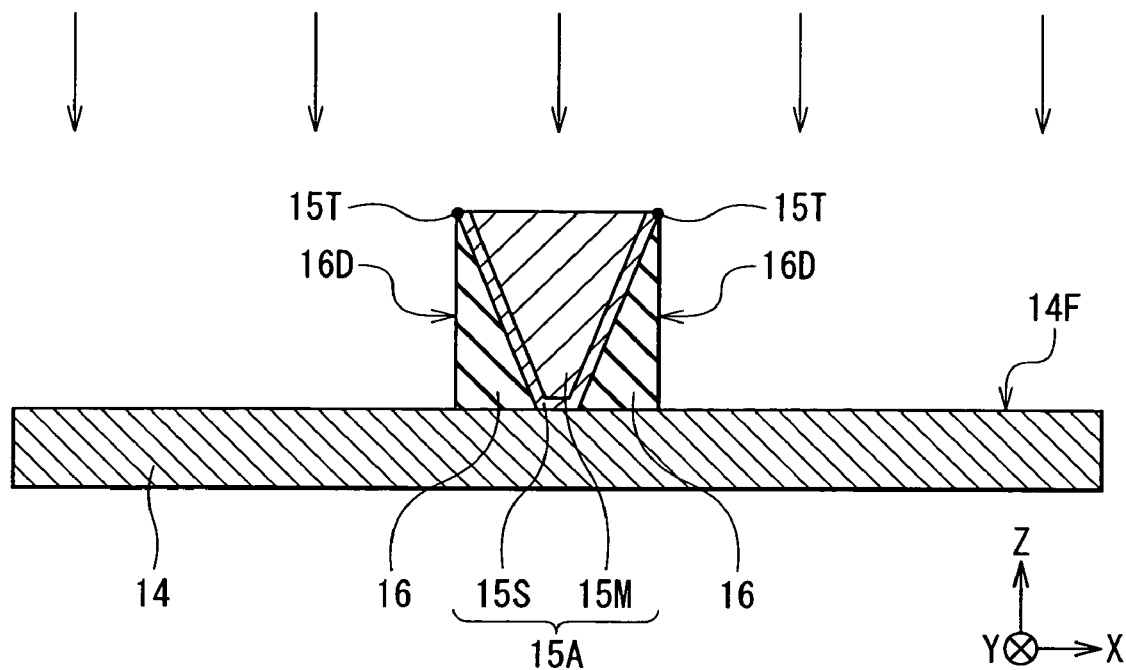
FIG. 9 is a sectional view to explain a step subsequent to that of FIG. 8.

Subsequently, as illustrated in FIG. 9, a portion adjacent to the tip portion 15A in the writing track width direction is caused to remain by etching the non-magnetic adjoining layer 16 by using the RIE process etc., with the tip portion 15A as a mask. When using the RIE process, type and composition of the etching gas and so on are adjusted to control a selection ratio so that the etching rate of the tip portion 15A becomes significantly slower than the etching rate of the non-magnetic adjoining layer 16. In this case, since the non-magnetic foundation layer 14 functions as the etching stop layer, the etching process is substantially completed at the time that the non-magnetic foundation layer 14 is exposed.

In the etching process, the non-magnetic adjoining layer 16 is sufficiently etched in the periphery region of the tip portion 15A (a region out of the shade of the tip portion 15A as viewed from the etching direction) while the non-magnetic adjoining layer 16 is hardly etched in the vicinity region of the tip portion 15A (a region under the shade of the tip portion 15A as viewed from the etching direction). For this reason, the outermost edge portions 15T in the writing track width direction of the tip portion 15A are located on the plane which coincides with the etching surfaces (side faces 16D) of the non-magnetic adjoining layer 16. Also, when the selection ratio is normalized, the non-magnetic adjoining layer 16 is etched downwardly in a vertical direction in the region out of the shade of tip portion 15A, so that the side face 16D becomes almost perpendicular to the surface plane 14F of the non-magnetic foundation layer 14. As a result, the cross sectional geometry of the integrated whole composed of the tip portion 15A and the non-magnetic adjoining layer 16 is virtually rectangular in shape.

Here, when etching of the non-magnetic adjoining layer 16, other etching methods such as an ion milling method may be used instead of the RIE process. In this case, a mask such as a photoresist pattern may be formed on the tip portion 15A, and the non-magnetic adjoining layer 16 may thereafter be etched with the mask, for example.

Figure 10:
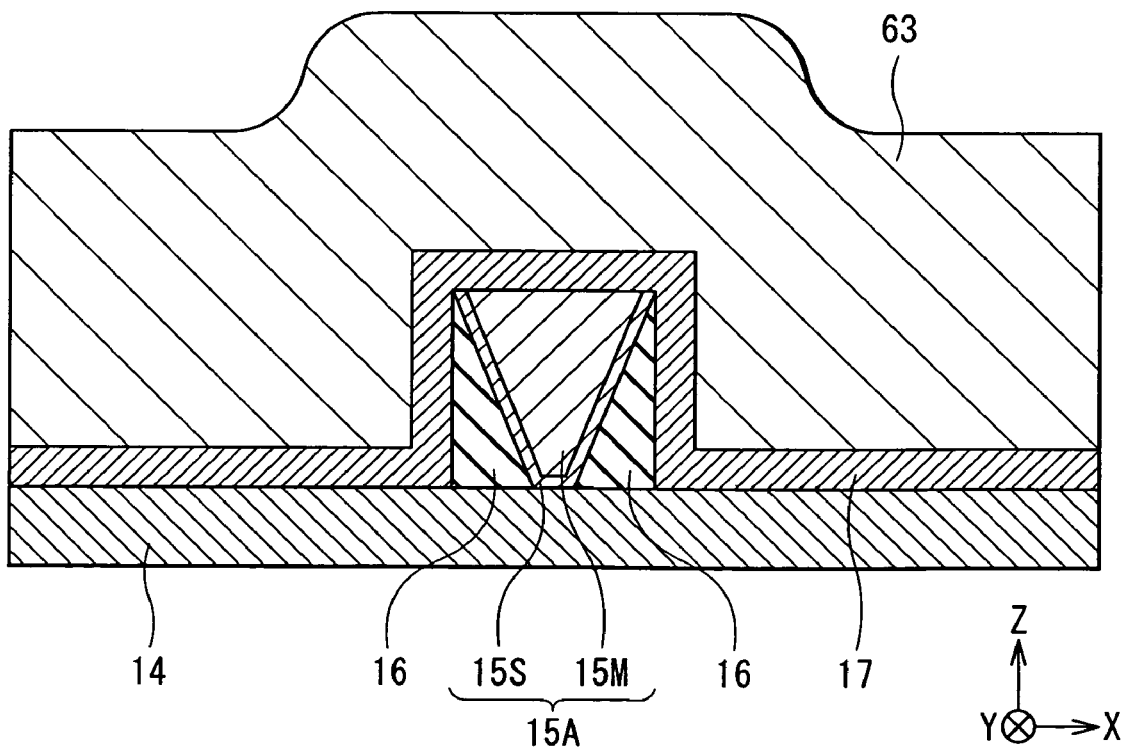
FIG. 10 is a sectional view to explain a step subsequent to that of FIG. 9.

Subsequently, the non-magnetic protruding layer 17 is formed to cover the tip portion 15A and the non-magnetic adjoining layer 16 as well as their surrounding non-magnetic foundation layer 14 with a sputtering process etc., as illustrated in FIG. 10. In this case, for example, a material (for example, ruthenium etc.), by which the non-magnetic protruding layer 17 can be utilized as a polishing stop layer when performing the polishing process with a CMP process etc. in the post-production process, is used. As the formation method of the non-magnetic protruding layer 17, an evaporation method, a chemical vapor deposition (CVD) process, and an atomic layer deposition (ALD) process or the like may be used in the case of vapor phase growth for example other than the sputtering process.

Subsequently, a dummy metal coating layer 63 is formed so as to cover the non-magnetic protruding layer 17. In this case, a magnetic material such as permalloy is used, for example. Also, thickness of the dummy metal coating layer 63 is provided sufficiently to completely embed the unevenness formed in the tip portion 15A and its peripheries, in order to planarize the dummy metal coating layer 63 in the post-production process. Here, when the non-magnetic protruding layer 17 is formed by using a non-magnetic conductive material, the dummy metal coating layer 63 may be grown with the non-magnetic protruding layer 17 utilized as an electrode film, for example.

Figure 11:
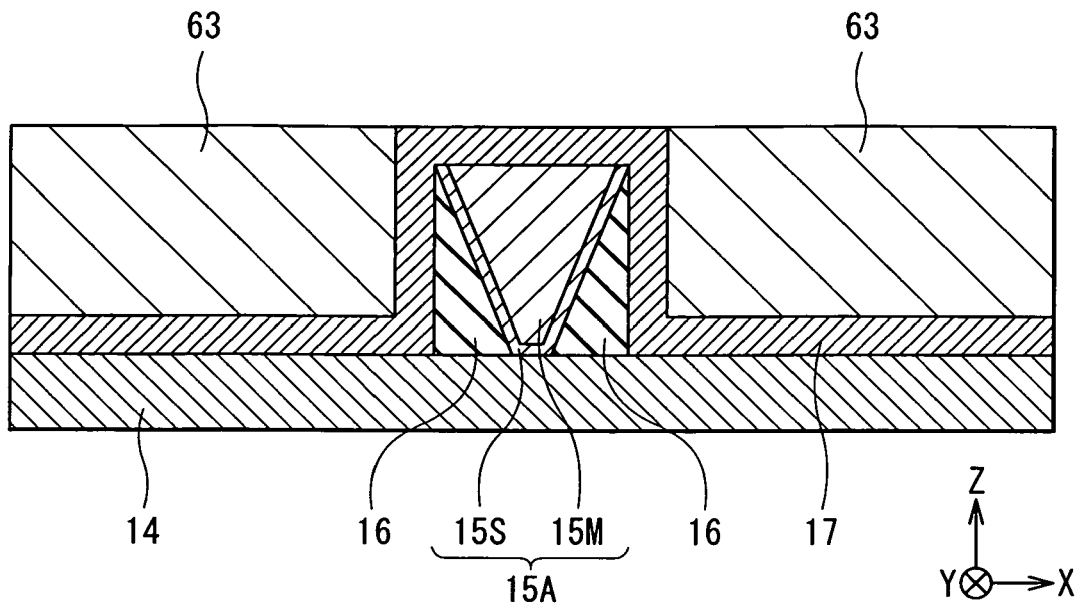
FIG. 11 is a sectional view to explain a step subsequent to that of FIG. 10.

Subsequently, the dummy metal coating layer 63 is polished and planarized with a CMP process etc., as illustrated in FIG. 11. In this case, for example, since the non-magnetic protruding layer 17 functions as a polishing stop layer, the polishing process is substantially completed at the time that the non-magnetic protruding layer 17 is exposed.

Figure 12:
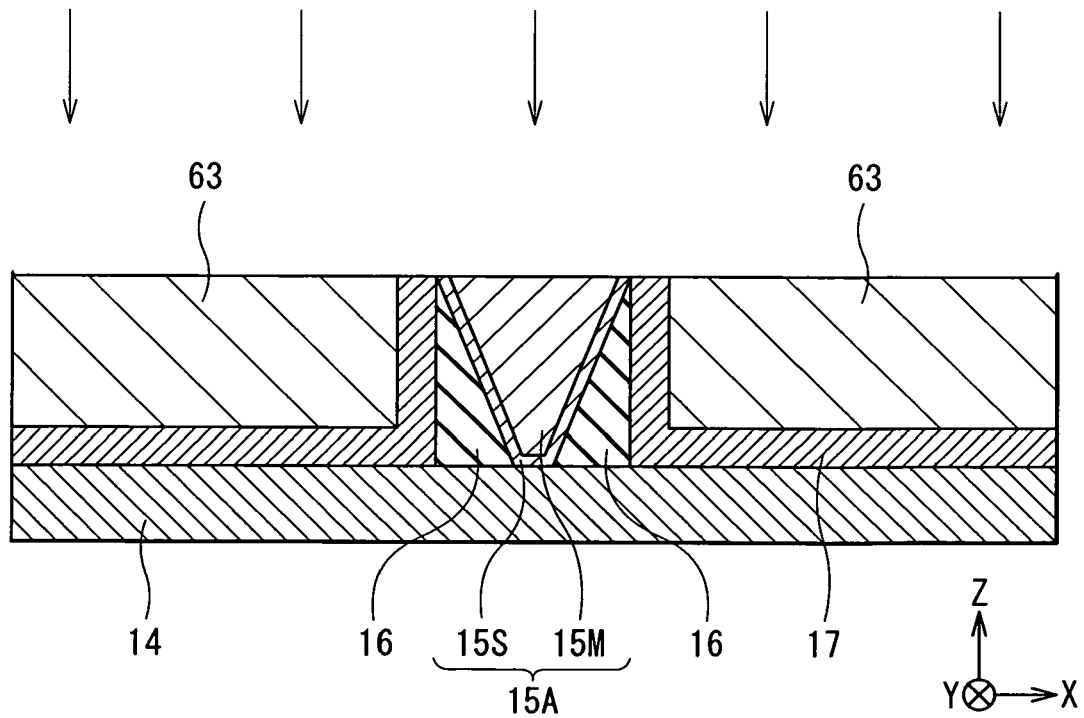
FIG. 12 is a sectional view to explain a step subsequent to that of FIG. 11.

Subsequently, the non-magnetic protruding layer 17 and the dummy metal coating layer 63 are partially etched and removed with an ion milling method etc., as illustrated in FIG. 12. In this case, the etching process is applied until the non-magnetic protruding layer 17 covering the tip portion 15A is removed and the tip portion 15A is exposed, for example.

Figure 13:
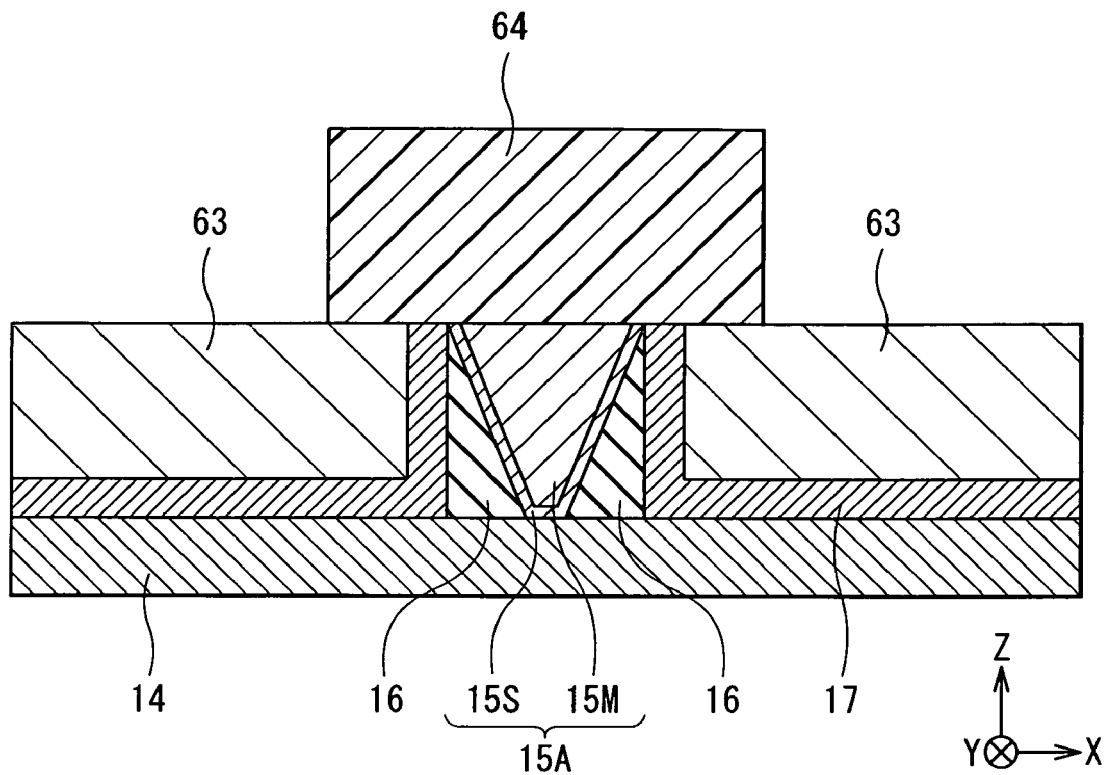
FIG. 13 is a sectional view to explain a step subsequent to that of FIG. 12.
Figure 14:
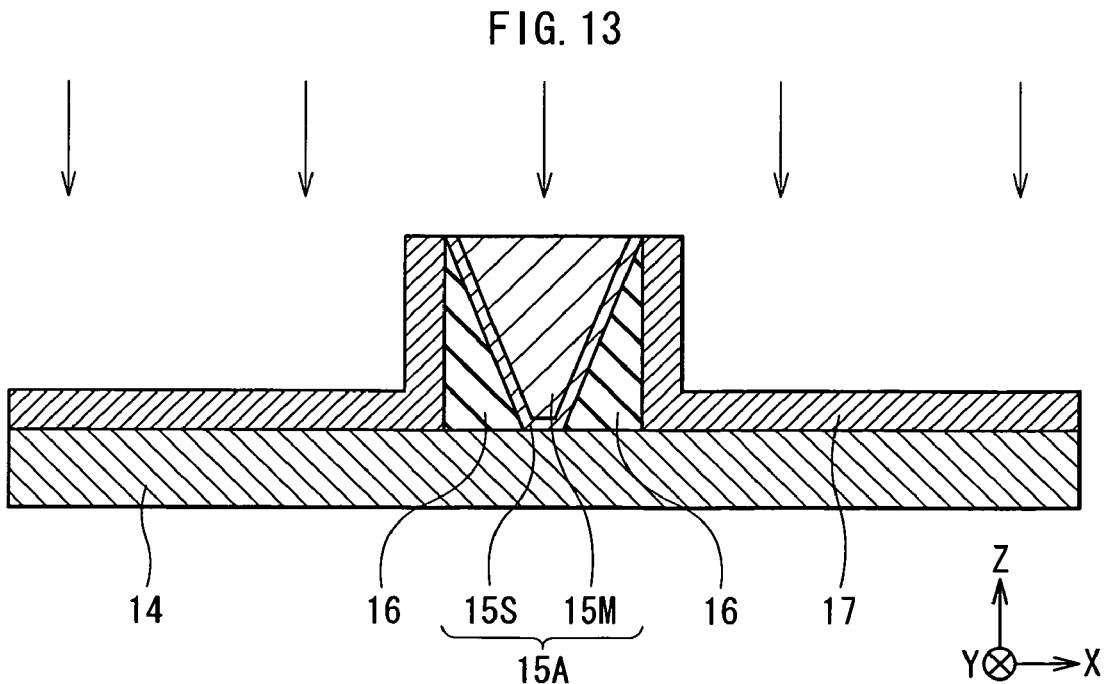
FIG. 14 is a sectional view to explain a step subsequent to that of FIG. 13.

Subsequently, a photoresist pattern 64 is formed at least on the tip portion 15A by using a photolithography method, as illustrated in FIG. 13. Subsequently, the dummy metal coating layer 63 is etched with an ion milling method etc. with the photoresist pattern 64 as a mask, to remove the dummy metal coating layer 63 and expose the non-magnetic protruding layer 17, as illustrated in FIG. 14. In the etching process, the tip portion 15A may also be partially etched from the trailing side together with the dummy metal coating layer 63, so that the thickness thereof is more decreased on the side close to the air bearing surface 40 than on the side far from the air bearing surface 40, for example. That is for concentrating the magnetic flux flowing through the inside of the tip portion 15A on the air bearing surface 40. In this case, the thickness of the tip portion 15A may be decreased gradually toward the air bearing surface 40 (taper formation), or may be decreased step-by-step (step-like formation).

Figure 15:
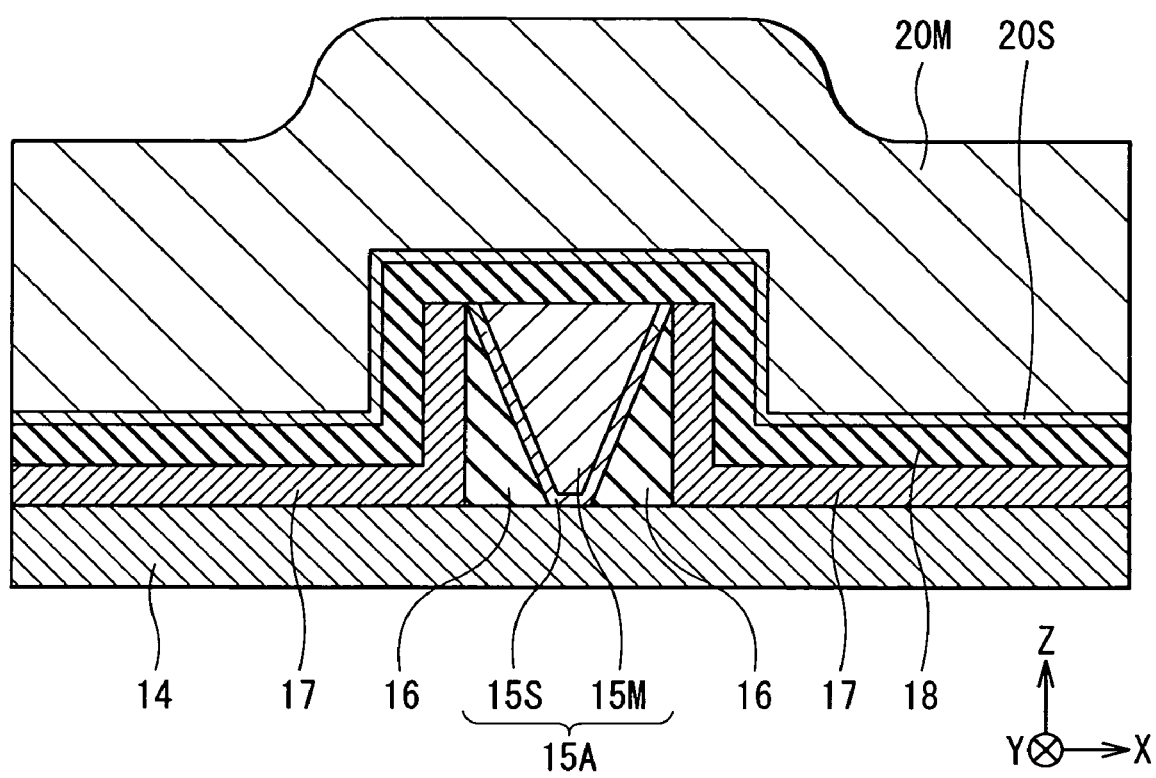
FIG. 15 is a sectional view to explain a step subsequent to that of FIG. 14.

Subsequently, the gap layer 18 is formed to cover the tip portion 15A and the non-magnetic protruding layer 17 with a sputtering process and so on, as shown in FIG. 15. In this case, an evaporation method, CVD method or ALD method may be used in the case of the vapor phase growth for example other than the sputtering process.

Finally, the write shield layer 20 is formed on the gap layer 18 as illustrated in FIGS. 2 and 15. A procedure of forming the write shield layer 20 is as follows, for example.

First, a seed layer 20S is formed to cover the gap layer 18 with a sputtering process etc., as illustrated in FIG. 15. In this case, similar magnetic material as the write shield layer 20 is used, for example.

Subsequently, a metal coating layer 20M is grown with the seed layer 20S as an electrode film. In this case, similar magnetic material as the write shield layer 20 is used, for example. Further, the thickness thereof is provided sufficiently to completely embed the unevenness formed in the tip portion 15A and its peripheries, in order to planarize the metal coating layer 20M in the post-production process, for example.

Further, the metal coating layer 20M is polished (planarized) with a CMP process etc., so that the metal coating layer 20M is caused to remain in such a manner as to surround the tip portion 15A on three sides, namely, both sides in the writing track width direction and the trailing side, via the gap layer 18 as illustrated in FIG. 2.

In this manner, the write shield layer 20 including the seed layer 20S and the metal coating layer 20M is formed, and thus the side shield layers 20A and 20B and the trailing shield layer 20C are formed integrally. Thereafter, a protective layer may be formed on the write shield layer 20 as necessary.

Subsequently, the substrate 1 on which a plurality of the stacked structure including the above-mentioned series of elements are arranged in matrix are sliced to obtain a plurality of bars (slider bars), and after pre-polishing the slider bar to adjust the dimensions of the read head section 100A and the write head section 100B, the air bearing surface 40 is formed with a CMP process etc.

Subsequently, in order to pre-treat (cleaning) the air bearing surface 40 before forming the protective film 41 in the post-production process, the air bearing surface 40 is etched with an ion milling method or a plasma etching process. In the etching process, the non-magnetic protruding layer 16 protrudes from the tip portion 15A, due to the difference in the etching rate between the tip portion 15A and the non-magnetic protruding layer 16. Namely, because of the difference in the etching rate among the tip portion 15A, the non-magnetic adjoining layer 16, the non-magnetic protruding layer 17, the gap layer 18 and the write shield layer 20, the positions of the one end surfaces thereof on the air bearing surfaces 40 side differ as illustrated in FIG. 2. Specifically, the one end surfaces of the tip portion 15A and the write shield layer 20 are located in the position P2 (air bearing surface 40). On the other hand, the one end surface of the non-magnetic protruding layer 17 of which etching rate is relatively low protrudes from the air bearing surface 40 and is located in the position P1. The one end surfaces of the non-magnetic adjoining layer 16 and the gap layer 18 of which etching rates are relatively high are recessed from the air bearing surface 40 and located in the position P3.

Finally, the protective film 41 is formed to cover the cleaned air bearing surface 40, thus the principal portion of the thin film magnetic head is completed. Thereafter, the slider bar is cut out for each stacked structure to obtain a plurality of chips (sliders).

In the thin film magnetic head according to the present embodiment, the non-magnetic protruding layer 17 protruding from the tip portion 15A toward the air bearing surface 40 side is formed on at least the part of the regions which include both side regions of the tip portion 15A in the writing track width direction and the trailing side region. In this case, the non-magnetic protruding layer 17 comes closer to the recording medium than the tip portion 15A at the time of writing operation, and is likely to be in contact with the recording medium instead of the tip portion 15A. Thereby, the protective film 41 covering the non-magnetic protruding layer 17 is peeled off easily while the protective film 41 covering the tip portion 15A is less likely to be peeled off, and thus the tip portion 15A is less likely to be damaged or corroded. Accordingly, since the tip portion 15A is protected physically and chemically by the non-magnetic protruding layer 17, the damage or the corrosion of the tip portion 15A are suppressed as compared with the case where the non-magnetic protruding layer 17 is not provided. In addition, since the soft magnetic characteristics of the tip portion 15A is less likely to deteriorate, the writing performance can be secured.

In particular, since the non-magnetic protruding layer 17 is formed (see FIG. 10) and then partially removed (see FIG. 12) to allow it to remain only on both sides of the tip portion 15A, the final trailing gap (write gap) is determined only by the thickness of the gap layer 18 without including the thickness of the non-magnetic protruding layer 17. Accordingly, since the write gap becomes thin, the magnetic field gradient in the vicinity of the trailing edge TE can be increased.

Meanwhile, although the plating process is used as the formation method of the main magnetic pole layer 15, it is not always limited thereto, and a vapor phase growth method such as a sputtering process may be used. This also applies to the formation method of the write shield layer 20.

Also, in FIG. 2, although the non-magnetic protruding layer 17 is provided on both sides of the tip portion 15A in the writing track width direction, it is not necessarily limited thereto. The formation position of the non-magnetic protruding layer 17 can be changed as needed, as long as the tip portion 15A can be protected physically and chemically by providing the non-magnetic protruding layer 17 in the surroundings, as viewed from the side of the air bearing surface 40, of the tip portion 15A.

Figure 16:
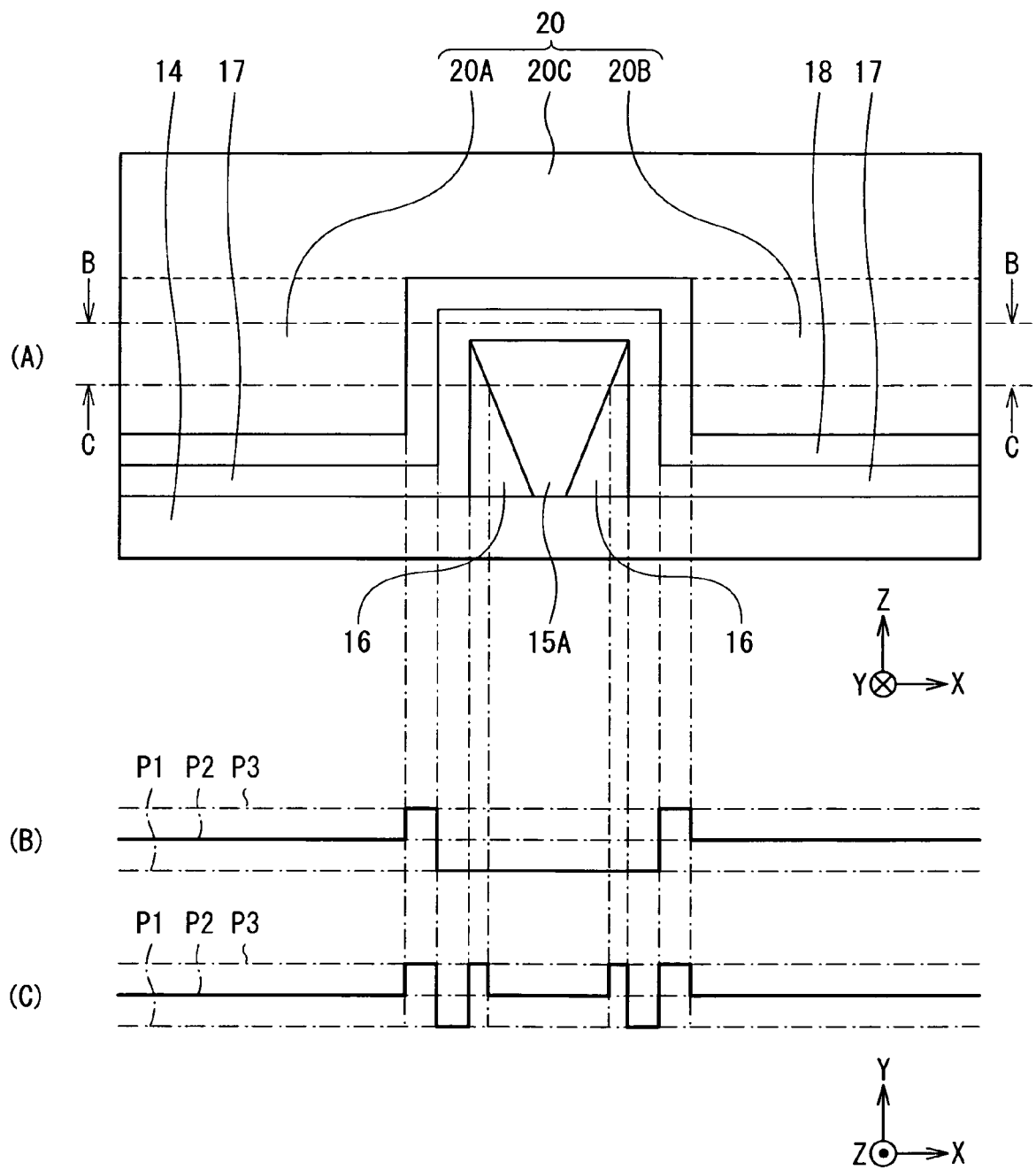
FIG. 16 is a sectional view illustrating a first modification with regard to the configuration of the principal portion of thin film magnetic head.

For example, as illustrated in FIG. 16, the non-magnetic protruding layer 17 may be provided not only on the both sides of the tip portion 15A but to the trailing side. In order to form such a non-magnetic protruding layer 17, the dummy coating layer 63 may be planarized until the non-magnetic protruding layer 17 is exposed (see FIG. 11), and then the production process subsequent to the formation of the photoresist pattern 64 (see FIG. 13) may be performed without etching the non-magnetic protruding layer 17.

Figure 17:
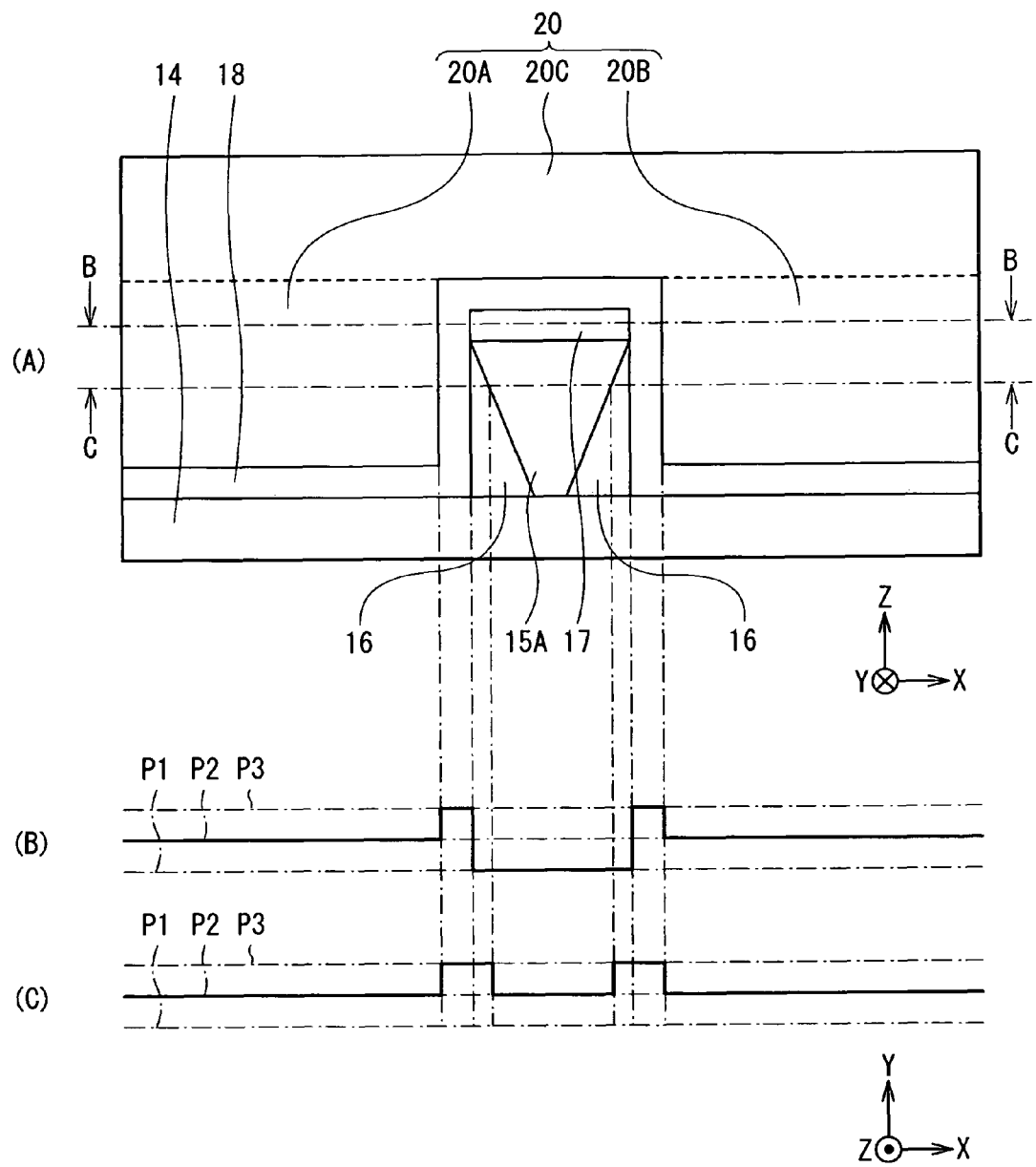
FIG. 17 is a sectional view illustrating a second modification with regard to the configuration of the principal portion of the thin film magnetic head.

For example, as illustrated in FIG. 17, the non-magnetic protruding layer 17 may be provided only on the trailing side of the tip portion 15A. In order to form such a non-magnetic protruding layer 17, the non-magnetic protruding layer 17 may be formed (see FIG. 10) and then a portion of the non-magnetic protruding layer 17 other than the trailing side portion may be etched and removed. Alternatively, the non-magnetic protruding layer 17 may be preformed only on the trailing side of the tip portion 15A.

In addition thereto, though not specifically illustrated, the non-magnetic protruding layer 17 may be provided only on one side of the tip portion 15A. In order to form such a non-magnetic protruding layer 17, the non-magnetic protruding layer 17 may be formed (see FIG. 11) and then portions other than the one side thereof may be etched and removed, or the non-magnetic protruding layer 17 may be preformed only on the one side of the tip portion 15A.

Figure 18:
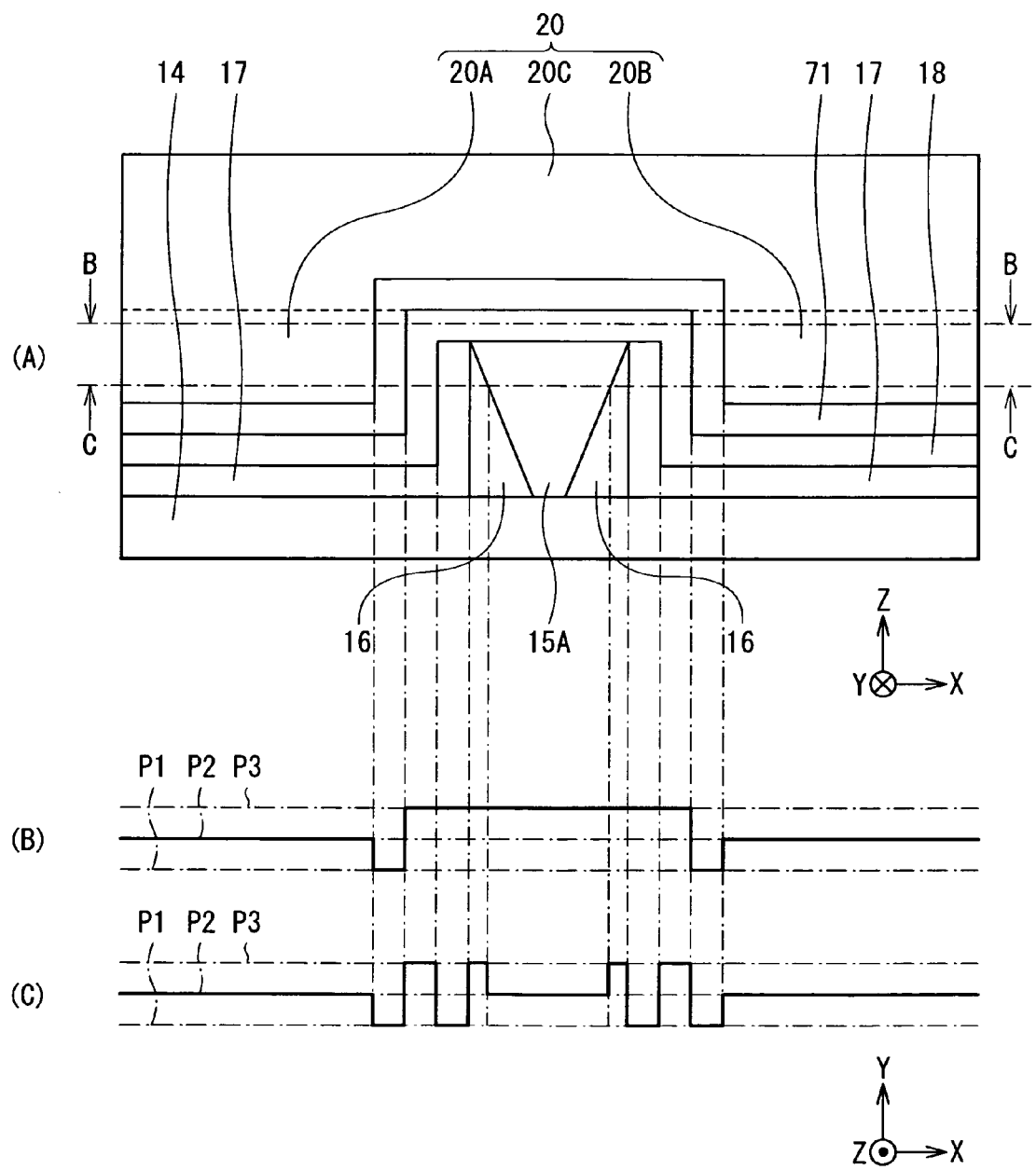
FIG. 18 is a sectional view illustrating a third modification with regard to the configuration of the principal portion of the thin film magnetic head.

Also, another one or two or more non-magnetic protruding layers in addition to the non-magnetic protruding layer 17 may be formed in a layer different from that of the non-magnetic protruding layer 17. For example, as illustrated in FIG. 18, a non-magnetic protruding layer 71 may be formed between the gap layer 18 and the write shield layer 20. In order to form such a non-magnetic protruding layer 71, the gap layer 18 may be formed (see FIG. 15), and the non-magnetic protruding layer 71 may be formed before the formation of the write shield layer 20. A formation material of the non-magnetic protruding layer 71 is similar to that of the non-magnetic protruding layer 17. In this case, since the tip portion 15A is protected physically and chemically by both of the non-magnetic protruding layers 17 and 71, the damage and the corrosion of the tip portion 15A can be suppressed more.

Figure 19:
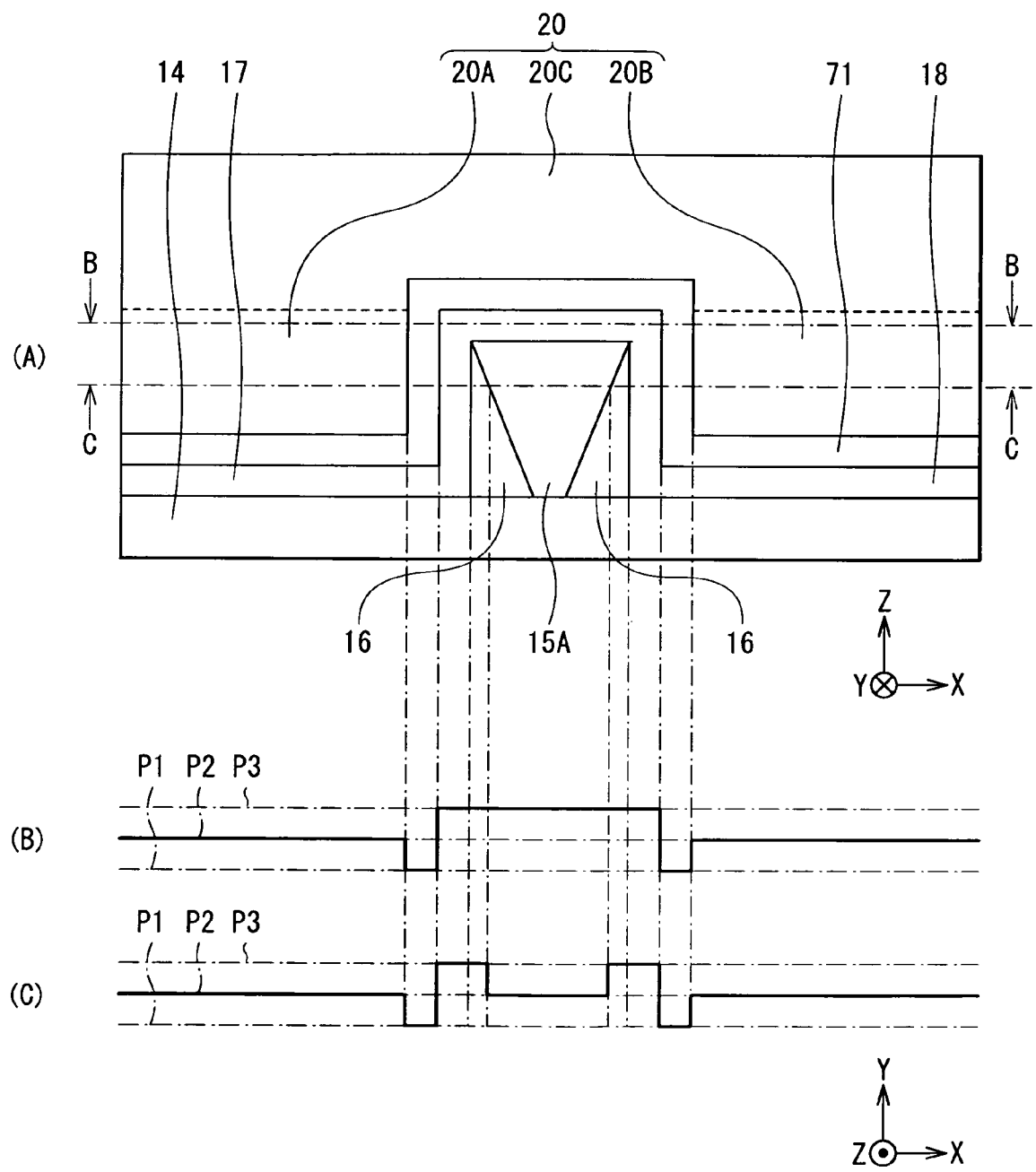
FIG. 19 is a sectional view illustrating a fourth modification with regard to the configuration of the principal portion of the thin film magnetic head.

Also, only the non-magnetic protruding layer 71 may be formed without providing the non-magnetic protruding layer 17, as illustrated in FIG. 19. Since the non-magnetic protruding layer 71 functions similarly to the non-magnetic protruding layer 17, similar effect is obtainable even in this case.

Although the etching process in the pretreatment which is previous to the formation of the protective film 41 is utilized so as to have the non-magnetic protruding layer 17 protruding from the tip portion 15A, it is not necessarily limited thereto, and any etching process other than the pretreatment may be utilized. In addition, any etching method other than the ion milling process and plasma etching process may be used as long as it can make the non-magnetic protruding layer 17 protruding from the tip portion 15A.

EXAMPLES

Subsequently, a concrete example of the present invention will be explained in detail.

First, the principal portion of the thin film magnetic head (FIG. 2) was formed by using formation materials represented in Table 1, and a surface configuration on an air bearing surface side was examined. In this case, after stacking and forming each element of the principal portion of the thin film magnetic head and the air bearing surface was formed, all elements were subjected to pretreatment (cleaning) through etching at a time with an ion milling process. In this case, argon (Ar) gas was used as the etching gas, with acceleration voltage of 500 mV and the accelerating current of 500 mA. When the surface configuration on the air bearing surface side (observation area: 1.0 μm*1.0 μm) was observed by using an atomic force microscope (AFM: atomic force microscope) and the protrusion amount of each element was measured, the result was obtained as represented in Table 1. A reference position (zero position) to measure the protrusion amount is the one end surface (air bearing surface) of the main magnetic pole layer (tip portion). Accordingly, when the protrusion amount is accompanied with the plus sign, that means that it protrudes from the one end surface of the tip portion, and when it is minus, that means that it is recessed from the one end surface of the tip portion.

TABLE 1

| Element | Main Magnetic Pole Layer | Non-magnetic Adjoining Layer | Non-magnetic Protruding Layer | | | | | Gap Layer | Write Shield Layer |
|---|---|---|---|---|---|---|---|---|---|
| Formation Material | FeCoNi | Al$_2$O$_3$ | Ru | Ti | Ta | Cr | NiCr | Al$_2$O$_3$ | FeCoNi |
| Protrusion Amount (nm) | — | −2.22 | 0.21 | 0.38 | 0.63 | 0.59 | 0.58 | −2.22 | 0 |

The protrusion amount was 0 nm for the write shield layer made of the material similar to that of the main magnetic pole layer, whereas it was about 0.21 nm to 0.63 nm for the non-magnetic protruding layers made of the material of which etching rate at the time of pretreatment is slower than that of the main magnetic pole layer, and it was minus 2.22 nm for the non-magnetic adjoining layer and the gap layer made of the material of which etching rate is faster than the main magnetic pole layer. Namely, the non-magnetic protruding layer was protruded from the one end surface of the tip portion without depending on the kind of the formation materials used here. When comparing the protrusion amount for each formation material of the non-magnetic protruding layer, the protrusion amount was suppressed to be small properly in the case where ruthenium or titanium was used. Therefore, using different formation materials between the main magnetic pole layer and the non-magnetic protruding layer allows the non-magnetic protruding layer to protrude from the one end surface of the tip portion, through utilizing the difference in etching rate during the pretreatment.

Subsequently, the writing operation test of the thin film magnetic head was performed to examine a state of corrosion of the main magnetic pole layer (tip portion). In this case, the principal portion of the thin film magnetic head was formed according to the procedure similar to that of the case where the surface configuration was examined, except that the non-magnetic protruding layer (ruthenium) was formed at first and then the protective film (DLC) was formed to cover the air bearing surface. Subsequently, the writing operation test was performed by mounting the thin film magnetic head in the hard disk drive and causing it to rotate at 5400 rpm. Subsequently, the thin film magnetic head was taken out from the hard disk drive and was stored in a high-humidity-high-temperature environment. The condition of preservation was set to the temperature of 85° C., humidity of 85% and storing time of four hours. Finally, whether or not the tip portion was corroded was visually tested after the preservation, and when fraction-defective (%)="(number of inferior goods divided by the number of the tests) multiplied by 100" was calculated, the result represented in Table 2 was obtained. In this case, the case in which the tip portion had not been corroded was defined as a non-defective product, and the case in which the tip portion had been corroded was defined as an inferior product. Upon checking the fraction defective, a principal portion of a thin film magnetic head which does not include the non-magnetic protruding layer was formed and its fraction defective was then also examined in a similar manner for comparative evaluation.

TABLE 2

|  | Non-magnetic protruding layer | |
| --- | --- | --- |
|  | Provided | Not provided |
| Number of tests | 10 | 10 |
| Number of good products | 10 | 7 |
| Number of inferior products | 0 | 3 |
| Fraction-defective (%) | 0 | 30 |

The fraction defective was thirty percent when the non-magnetic protruding layer was not used, but was zero percent when the non-magnetic protruding layer was used. Namely, the corrosion of the tip portion was prevented when the non-magnetic protruding layer was used. Therefore, the corrosion of the tip portion can be suppressed by providing the non-magnetic protruding layer around the tip portion.

Accordingly, although the present invention has been described with reference to the embodiment and the example, the present invention is not limited to the above-described embodiment and the example, and can be modified in various ways. For example, although the perpendicular magnetic write head of the present invention is applied to a combined head, it is not necessarily limited thereto, and it may be applied to a write-only head which is not provided with the read head section.

What is claimed is:

1. A perpendicular magnetic write head comprising:
a magnetic pole;
a non-magnetic protruding layer formed on side regions of the magnetic pole in a writing track width direction of the magnetic pole, and no other regions of the magnetic pole, the non-magnetic protruding layer protruding from the magnetic pole toward an air bearing surface (ABS) side; and
a protective film formed to cover at least the magnetic pole from the air bearing surface side,
wherein (a) the non-magnetic protruding layer has an etch rate lower than an etch rate of the magnetic pole such that the non-magnetic protruding layer etches more slowly than the magnetic pole when forming the ABS side, and (b) the non-magnetic protruding layer includes at least one of ruthenium (Ru), titanium (Ti), tantalum (Ta), tungsten (W), chromium (Cr), and a nickel chromium alloy (NiCr).

2. A perpendicular magnetic write head comprising:
a magnetic pole;
first and second non-magnetic protruding layers each formed on (a) side regions of the magnetic pole in a writing track width direction of the magnetic pole, and (b) a trailing side region of the magnetic pole, the first and second non-magnetic protruding layers protruding from the magnetic pole toward an air bearing surface (ABS) side; and
a protective film formed to cover at least the magnetic pole from the air bearing surface side,
wherein the non-magnetic protruding layers each have an etch rate lower than an etch rate of the magnetic pole such that the non-magnetic protruding layers etch more slowly than the magnetic pole when forming the ABS side, and the non-magnetic protruding layers each include at least one of ruthenium (Ru), titanium (Ti), tantalum (Ta), tungsten (W), chromium (Cr), and a nickel chromium alloy (NiCr).

* * * * *